Nov. 29, 1949 W. G. COLGAN 2,489,271
FOLDABLE DECOY
Filed Oct. 18, 1946 4 Sheets-Sheet 1
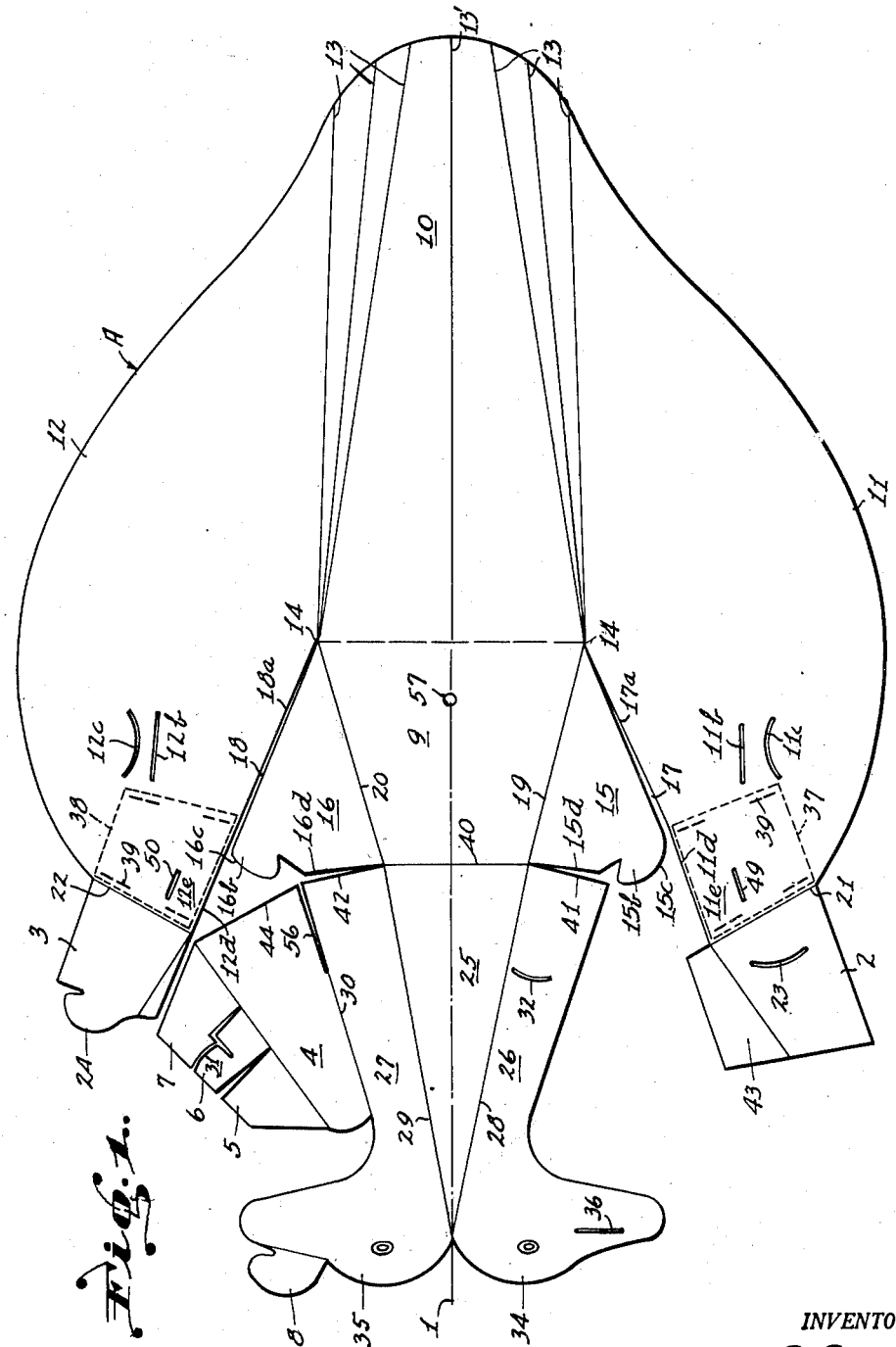
INVENTOR.
WILLIAM G. COLGAN
BY
Munn, Liddy & Glaccum
ATTORNEYS

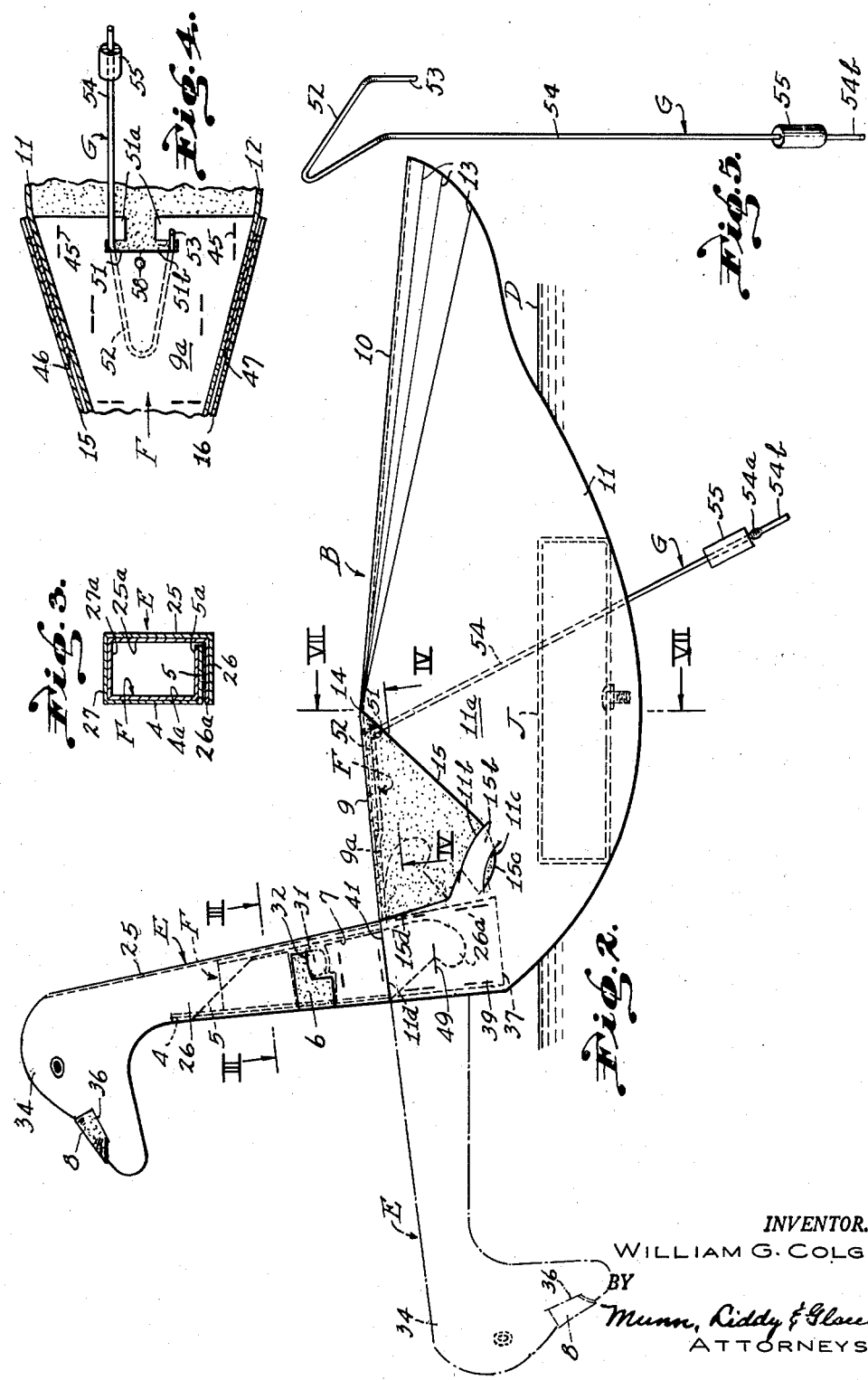

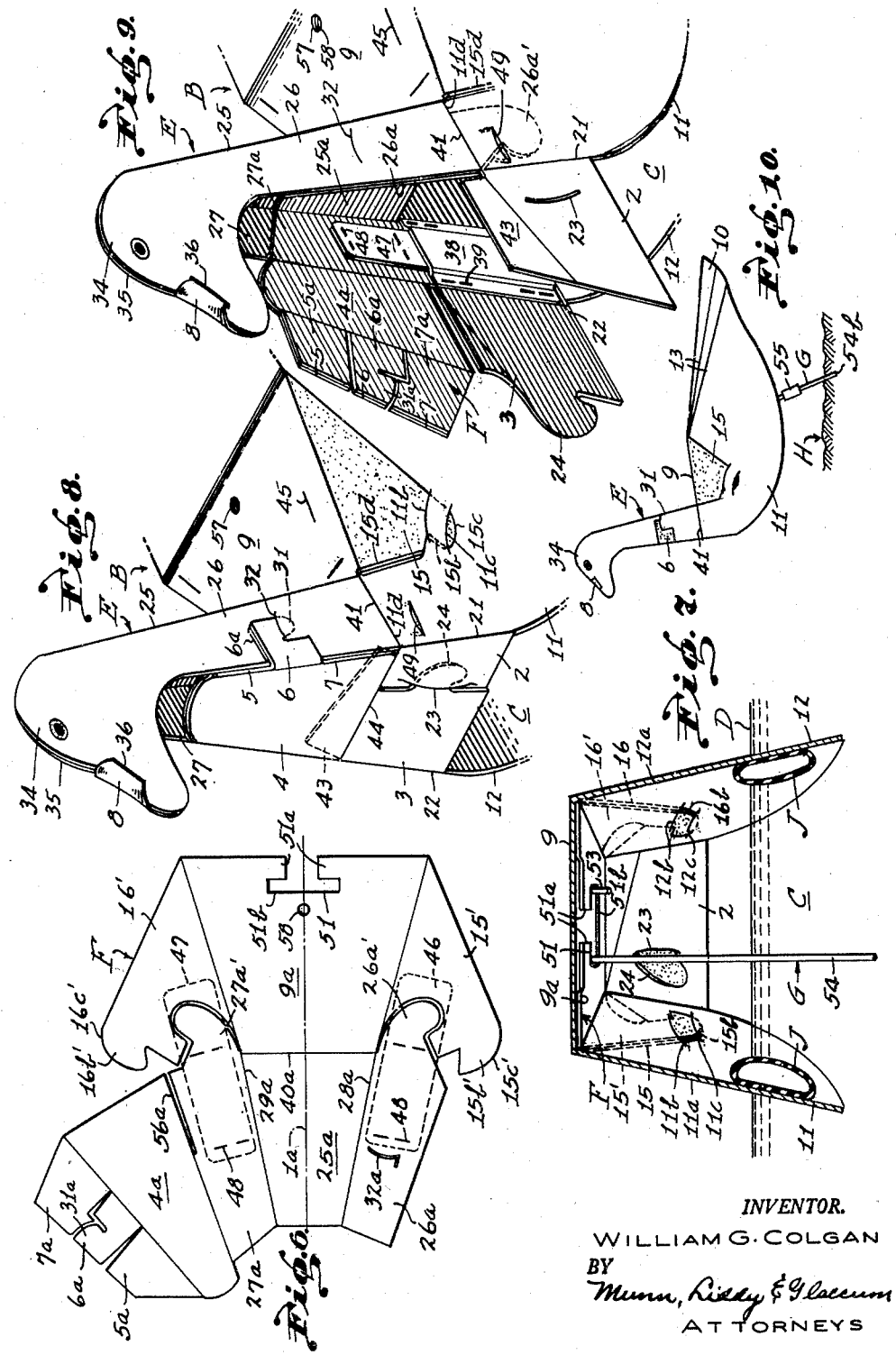

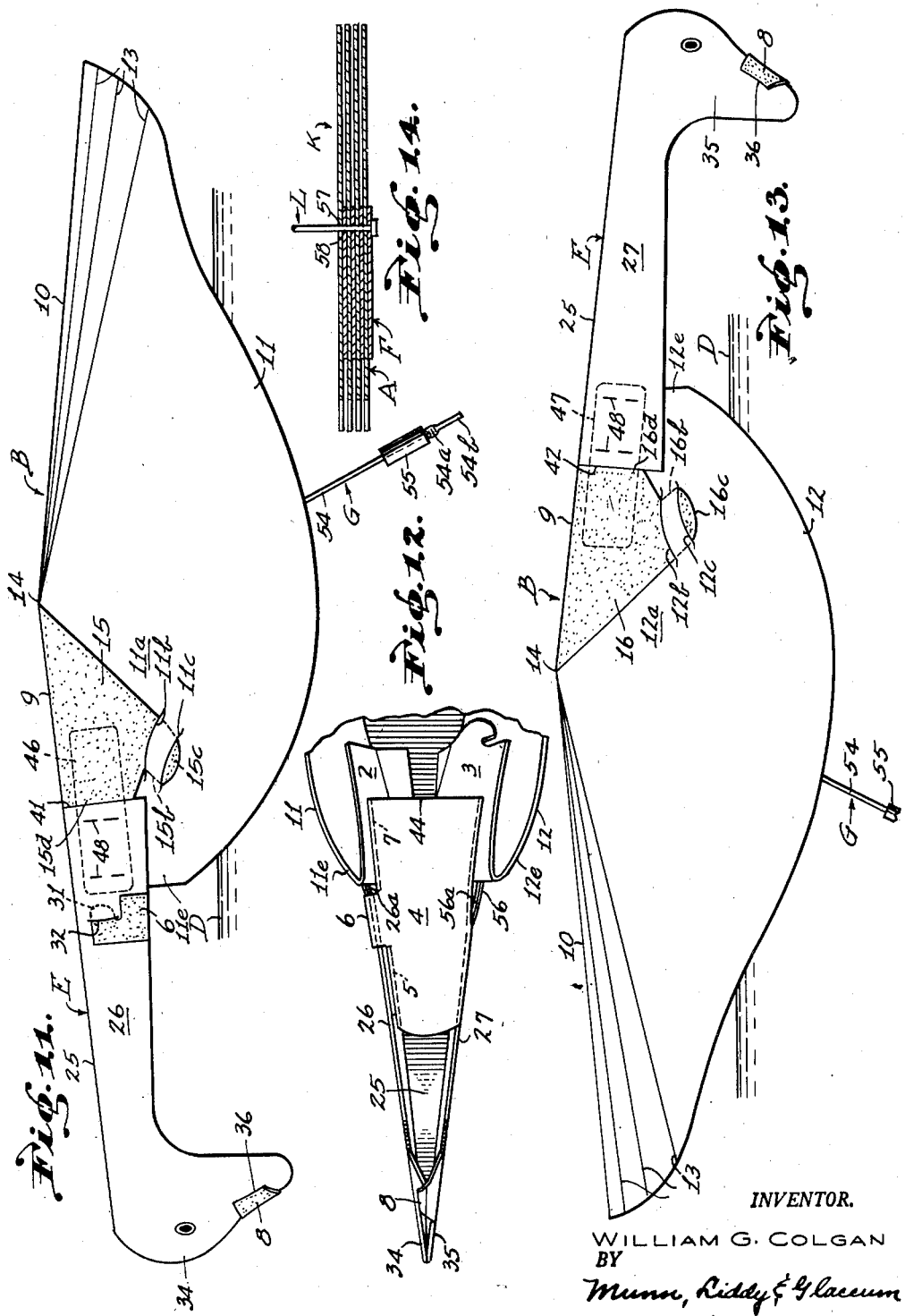

Patented Nov. 29, 1949

2,489,271

UNITED STATES PATENT OFFICE 2,489,271

FOLDABLE DECOY

William G. Colgan, Oakland, Calif.

Application October 18, 1946, Serial No. 704,007

8 Claims. (Cl. 43—3)

1

The present invention relates to improvements in a foldable decoy; and it consists of the combinations, constructions and arrangement of parts hereinafter described and claimed.

An object of my invention is to provide a foldable decoy, which is an improvement over the decoy disclosed in my copending application, Serial No. 648,576, filed in the United States Patent Office on February 19, 1946.

In that application, I illustrated a decoy made from a foldable blank. The blanks were so constructed that they could be packaged in knockdown condition, and readily assembled for display by sportsmen on ponds, lakes and the like. The body of the decoy was provided with an open channel extending lengthwise therethrough for allowing waves, wind and tide to pass through the channel, thereby decreasing the possibility of the decoy capsizing.

It is proposed in the present invention to provide a decoy having sides and breast flaps extending across the front of the sides so as to hold the latter a predetermined distance apart. This arrangement presents a more rigid decoy than the one illustrated in my copending case. At the same time, the breast of the decoy is sufficiently high to allow waves, wind and tide to pass through the space between the sides of the decoy.

Another object of my invention resides in the provision of a tubular neck that is provided with a front flap. The latter reinforces the neck when the decoy is assembled, but at the same time allows the decoy to be flattened out when desired.

Furthermore, I propose to provide a decoy having a reinforcing member secured to the back and sides of the decoy body, thus adding rigidity to the latter. This reinforcing member is utilized for attaching a ballast wire to the decoy, and may extend into the decoy's neck for reinforcing it.

A still further object is to arrange the neck in such a manner that it may be supported on the decoy body in a natural upright position, or swung into a substantially horizontal feeding attitude. Thus the habits of wild birds, such as geese or ducks, may be approximated and the display will be more realistic.

Other objects and advantages will appear as the specification continues, and the novel features will be set forth in the appended claims.

For a better understanding of my invention, reference should be had to the accompanying drawings, forming part of this application, in which:

2

Figure 1 is a plan view of the blank from which a decoy is fashioned;

Figure 2 is a side elevation of an assembled decoy, disclosing in broken lines the position assumed by the neck and head when in a feeding attitude;

Figures 3 and 4 are horizontal sectional views taken along the lines III—III and IV—IV, respectively, of Figure 2;

Figure 5 is a perspective view of the ballast wire that I employ;

Figure 6 is a plan view of the reinforcing member that I utilize;

Figure 7 is a vertical transverse section taken along the line VII—VII of Figure 2;

Figure 8 is a fragmentary isometric view of the front portion of an assembled decoy;

Figure 9 is a view similar to Figure 8, but showing the breast and neck flaps swung open;

Figure 10 is a side elevation on a reduced scale, illustrating a staked-out decoy;

Figure 11 is a side elevation of one of my decoys in feeding position;

Figure 12 is an underneath plan view of the front portion of Figure 11;

Figure 13 is an elevation taken from the opposite side of Figure 11; and

Figure 14 is a longitudinal section taken through a stack of blanks and showing them supported on a carrying rod.

While I have shown only the preferred form of my invention, it should be understood that various changes, or modifications, may be made within the scope of the annexed claims without departing from the spirit thereof. Although I shall describe a goose as the specification proceeds, it will be apparent that decoys simulating other wild birds, such as ducks, may be formed from similar blanks.

In carrying my invention into practice, I provide a blank indicated generally at A in Figure 1 from which a goose B is fashioned (see Figures 2, 8, 9, 11 and 13). This blank is identical on opposite sides of its median line 1, except for breast flaps 2 and 3, a front of the neck flap 4 with its tongues 5, 6 and 7 and a hook-shaped flap 8 provided on one of the head sections.

Referring further to the details of the blank A, it will be noted that I have shown a quadrangular-shaped back 9 having a tail 10 extending rearwardly therefrom. Sides 11 and 12 project laterally from the back and tail when the blank is flat, as shown in Figure 1. Upon assembling the goose, the sides 11 and 12 extend downwardly in slightly diverging relation with one another, as disclosed in Figure 7.

In order to facilitate the downwardly-folding of the sides 11 and 12, and to give an arched effect to the tail, I have scored the blank by lines 13. These score lines radiate from corners 14 of the back. Also, a central score line 13' is provided.

Wings 15 and 16 are formed integrally with the back 9 and are separated from the sides 11 and 12, respectively, by cut-away portions 17 and 18. Score lines 19 and 20 facilitate downwardly-folding of the wings 15 and 16, respectively, with respect to the back 9. When the wings are folded downwardly, they bear against the outer surfaces 11a and 12a of the sides 11 and 12, respectively (see Figure 7).

A hook-shaped tongue 15b is arranged for passage through slot 11b in the side 11 and the curved edge 15c of the hook passes through another slot 11c formed in the same side (see Figure 11). In a like manner, a hook-shaped tongue 16b passes through slot 12b in the side 12 and its curved edge 16c is lodged in another slot 12c fashioned in the side 12 (see Figure 13). Thus, the wings 15 and 16 are anchored to the sides 11 and 12, respectively, and reinforce the latter. At the same time, the back 9 is drawn down slightly so that it will abut upper edges 17a and 18a of the cut-away portions 17 and 18, respectively.

The breast flaps 2 and 3, previously mentioned, are formed integrally with the sides 11 and 12, respectively. Score lines 21 and 22 are provided so that these flaps may be folded inwardly across the breast of goose, as shown in Figure 8. The breast flap 2 has a slot 23 therein for receiving a hook-shaped tongue 24 projecting from breast flap 3. When the tongue 24 is interlocked with the slot 23, the sides 11 and 12 are drawn toward one another slightly. The breast flaps serve to space the sides apart a predetermined distance.

It will be observed from Figures 7 and 9, inclusive, that a channel C extends lengthwise through the decoy. When the latter is floating in water D, the breast flaps 2 and 3 are sufficiently high to clear the water. This will permit waves, wind and the tide to pass through the channel C, thus aiding in preventing the decoy from capsizing.

Next, I will describe the construction of the combined neck and head E of my decoy. Figure 1 shows a triangular rear of the neck section 25 having neck side sections 26 and 27 formed integrally therewith. Score line 28 is formed between the sections 25 and 26, while score line 29 is provided between sections 25 and 27 (see Figure 1).

The front flap 4 of the neck is integral with the neck side section 27 and a score line 30 is provided therebetween. After the flap 4 is folded across the front of the neck so as to extend between the neck side sections 26 and 27, the tongues 5 and 7 are inserted into the hollow part of the neck so that these tongues will parallel the neck side section 26. The neck thus provided is tubular and rectangular in horizontal section, as disclosed in Figure 3.

The tongue 6 overlaps the outer surface of the neck side 26 and has a hook-shaped tab 31 thereon. In Figures 2, 8 and 11, I show this tab projecting through a slot 32 formed in the neck side section 26. This arrangement locks the front of the neck flap 4 to the neck side section 26.

Head portions 34 and 35 extend from the tops of the neck side sections 26 and 27, respectively, and point in opposite directions when the blank A is flattened out, as in Figure 1. However, when the decoy is assembled, these head portions are moved into abutting relation with one another. At this time, the hook-shaped flap 8 on the head portion 35 is folded over the head portion 34 and engaged with slot 36 fashioned in the latter.

The inner surfaces of the forward portions 11e and 12e of the main sides 11 and 12 have strips of material 37 and 38 secured thereto, respectively, by staples 39, or other suitable fastening means. These strips define upwardly-opening pockets, which are utilized for holding the combined neck and head E in upright position in the manner hereinafter set forth.

The triangular rear neck section 25 is swingable relative to the back 9 and a score line 40 (see Figure 1) is provided therebetween. Upon swinging the combined neck and head upwardly, the lower edges 41 and 42 of the neck sides 26 and 27 are brought to rest upon upper edges 11d and 12d of the sides 11 and 12, respectively.

In Figures 1, 8 and 9, I disclose the breast flap 2 as having an upwardly-extending portion 43. The latter is folded inwardly relatively to the tubular neck and passes beneath the lower edge 44 of the front neck flap 4 to support the latter when the decoy is fully assembled and the combined neck and head E is held in upright position.

In order to stiffen the blank A and make it more rigid and durable, I make use of a reinforcing member indicated generally at F (see Figure 6). This member is applied to the underneath side of the blank A (see Figure 2) so that its median line 1a registers with the median line 1 of the blank A. The member F has a quadrangular-shaped portion 9a and a truncated triangular portion 25a, which register with the back 9 and the rear of the neck 25, respectively. Score line 40a is formed between the sections 9a and 25a. Staples 45, or other suitable fastening means, are used for anchoring the reinforcing member F to the blank A.

Wings 15' and 16' on the reinforcing member F underlie the wings 15 and 16, respectively, of the blank A. The wings 15' and 16' have hook-shaped tongues 15b' and 16b' which pass inwardly through the slots 11b and 12b, respectively. The curved lower edges 15c' and 16c' of these tongues are lodged in the slots 11c and 12c, respectively. In other words, the hook-shaped tongues 15b' and 16b' on the reinforcing member F coincide with the hook-shaped tongues 15b and 16b, respectively.

The reinforcing member F has side flaps 26a and 27a thereon, which register with the opposing neck side sections 26 and 27, respectively. Score lines 28a and 29a facilitate folding of the flaps 26a and 27a so that they will register with and reinforce the neck side sections 26 and 27, respectively, as shown in Figure 3.

Further, the reinforcing member F is fashioned with a truncated triangular portion 4a that registers with the inner surface of the front neck flap 4. Tongues 5a, 6a and 7a on the reinforcing member coincide with the tongues 5, 6 and 7 of the blank A, as illustrated in Figure 9. A hook-shaped tab 31a on the tongue 6 also passes through the slot 32 on the neck side section 26.

Although I have shown the reinforcing member F as extending into the neck of the decoy, this member may be cut along a score line 40a (see Figure 6) so that only the back 9 and wings 15 and 16 will be reinforced.

Bars 46 and 47 are secured to the side flaps 26a and 27a, respectively, by staples 48, or other fastening means. These bars project beyond the lower edges of the flaps 26a and 27a when the combined neck and head E is presented in upright position, as shown in Figure 2. The bars 46 and 47, respectively, are insertable into the pockets defined by the strips of material 37 and 38, and thus hold the neck in an upright attitude.

The side flaps 26a and 27a have hook-shaped tongues 26a' and 27a' that enter the pockets provided by the strips of material 37 and 38, as suggested in Figure 9. Slots 49 and 50 are formed in the forward parts 11e and 12e of the sides 11 and 12, respectively, and the material defining these slots may be pressed inwardly for engaging with the hook-shaped tongues 26a' and 27a', thus serving to retain the bars 46 and 47 in their respective pockets.

The means for providing a ballast for the decoy now will be set forth. In Figures 4, 6 and 7, I show a T-shaped recess 51 fashioned in the reinforcing member F. This recess defines a pair of flaps 51a that project toward one another. A ballast wire G has a U-shaped upper end 52 that is insertable through the cross-bar 51b of the T-shaped recess 51, with the sides of the U extending between the reinforcing member F and the back 9 of the blank A.

The ballast wire has a turned-down end 53 on one end of the U, while a main leg 54 extends from the other end of the U and projects downwardly through the channel C defined between the sides 11 and 12. The flaps 51a hook behind the turned-down end 53 and the leg 54 for removably holding the U in the T-shaped recess, as clearly shown in Figure 4.

A ballast weight 55 is slidably disposed on the leg 54 and its downward movement along this leg is limited by an enlarged portion 54a formed on the leg 54. This weight is movable upwardly along the ballast wire so that the lower end 54b may be pushed into the ground H (see Figure 10) to provide a stake-out decoy.

Inflated compartments J are secured to the inner surfaces of the sides 11 and 12 in order to float the decoy B when the latter is disposed on the water D.

Next, I will describe the structural features that permit the combined neck and head E to be moved into a substantially horizontal feeding position, as disclosed in Figures 11 to 13, inclusive. The rear of the neck section 25 is swingable relative to the back 9, and this movement is facilitated by the score line 40. The opposing neck side sections 26 and 27 may be arranged on the outer surface of the sides 11 and 12, respectively, as suggested in Figures 11 and 13. The breast flaps 2 and 3 are disengaged from each other and are folded inwardly, as shown in Figure 12. The front neck flap 4 is movable into a position between these folded-in breast flaps.

In Figure 1, I illustrate a cut-away portion 56 as being fashioned between the neck side section 27 and the front neck flap 4. It will be noted from Figure 6 that a similar cut-away portion 56a is provided between the neck side flap 27a and the triangular portion 4a. These cut-away portions receive the forward part 12e of the side 12 when the neck is disposed in a substantially horizontal position. Likewise, the forward part 11e of the side 11 fits into the space defined between the tongue 7 and side flap 26a (see Figure 12).

The projecting ends of the bars 46 and 47 are insertable underneath the wings 15' and 16' of the reinforcing member F to limit further downward movement of the combined neck and head E. At the same time, the lower edges 41 and 42 of the neck sides 26 and 27, respectively, abut against the forward edges 15d and 16d of the wings 15 and 16, respectively (see Figures 11 and 13). This arrangement further limits downward swinging movement of the combined neck and head E.

Figure 14 illustrates a stack K of blanks A arranged one above the other, each blank having a reinforcing member F secured thereto. Figure 1 shows an opening 57 formed in the back 9, while Figure 6 discloses an opening 58 in the reinforcing member F. These openings are presented in aligned relation with each other in the stack, and a carrying and supporting rod L passes therethrough. When the decoys are not in use, the carrying rod is utilized as a hanging support for the decoys.

Having thus described the various features of my decoy, the assembly thereof may be summarized briefly as follows:

The sides 11 and 12 of the decoy body are folded downwardly so that the tail 10 will be curved in transverse section. The breast flaps 2 and 3 are drawn toward one another and the hook-shaped tongue 24 on the breast flap 3 is interlocked in the slot 23 formed in the breast flap 2.

As the next step, the wing 15' of the reinforcing member F and the wing 15 of the blank A are drawn downwardly over the outer surface of the side 11. Their hook-shaped ends 15b' and 15b are interengaged with the slots 11b and 11c (see Figures 8 and 11). In a like manner, the hook-shaped ends 16b' and 16b of the wings 16' and 16 are interlocked with the slots 12b and 12c (see Figure 13).

The sportsman now swings the rear of the neck section 25 of the blank A into the position shown in Figure 9. The side of the neck section 26 and 27 of the blank A and corresponding sections 26a and 27a of the reinforcing member F are folded forwardly. Next, the flaps 4 and 4a are folded across the front of the decoy's neck, and the tongues 5, 7, 5a and 7a are pushed inwardly of the neck, as shown in Figure 8. At this time, the hook-shaped tabs 31 and 31a are engaged in the slot 32 and pass through a slot 32a formed in the neck side 26a (see Figure 6). The hook-shaped tab 8 on one head section is engaged with the slot 36 on the other head section.

The sportsman now introduces the projecting end of the bar 46 and the hook-shaped tongue 26a' into the pocket defined by the piece of material 37. Similarly, the projecting end of the bar 47 and the hook-shaped tongue 27a' are inserted into the pocket provided by the piece of material 38. Care is taken to insure that the upstanding portion 43 on the breast flap 2 passes beneath the lower edge 44 of the front neck flap, as illustrated in Figure 8.

As a final step, the U-shaped end 52 of the ballast wire G is inserted through the T-shaped recess 51 in the reinforcing member F until the tabs 51a hook behind the turned-down end 53 and the leg 54 of the ballast wire. The compartments J are inflated at any suitable time so that the decoy will float on the water D.

When the sportsman desires to have a stake-out decoy, the lower end 54b of the ballast wire G is pushed into the ground H, as shown in Figure 10. In the event that the sportsman desires to make a permanent feeding decoy, the breast flaps 2 and 3 may be cut off.

The decoy may be converted into a feeding attitude by disengaging the bars 46 and 47 and also the tongues 26a' and 27a' from the pockets defined by the pieces of materials 37 and 38, respectively. Next, the breast flaps 2 and 3 are folded inwardly of the decoy body, as illustrated in Figure 12. When this has been accomplished, the combined neck and head E is swung into a substantially horizontal position. The bar 46 and hook-shaped tongue 26a' are inserted under the wings 15 and 15', as in Figure 11. Likewise, the bar 47 and hook-shaped tongue 27a' are placed under the wings 16' and 16, as in Figure 13 of the drawings.

I claim:

1. In a foldable decoy; a decoy body, including a back and spaced-apart sides; the sides near the forward parts thereof having pockets; an upwardly-extending neck swingably secured to the back and terminating in a head; the neck including opposing side sections; and bars secured to the opposing side neck sections to project below the bottom edges of the latter and enter the pockets; the projecting ends of the bars, when placed in the pockets, holding the neck and head in an upwardly-extending direction.

2. In a foldable decoy; a decoy body, including a back and spaced-apart sides; the sides near the forward parts thereof having pockets; an upwardly-extending neck swingably secured to the back and terminating in a head; the neck including opposing side sections; and bars secured to the opposing side neck sections to project below the bottom edges of the latter and enter the pockets; the projecting ends of the bars, when placed in the pockets, holding the neck and head in an upwardly-extending direction; the neck being swingable into a substantially horizontal position when the bars are removed from the pockets.

3. In a decoy; a decoy body, including a back and downwardly-extending spaced-apart sides; a reinforcing member secured to the underside of the back and having a recess fashioned therein; and a ballast wire having a U-shaped upper end insertable into the recess with the sides of the U extending between the reinforcing member and the back; the ballast wire having a leg extending downwardly between the spaced-apart sides.

4. In a decoy; a decoy body, including a back and downwardly-extending spaced-apart sides; a reinforcing member secured to the underside of the back and having a recess fashioned therein; a ballast wire having a U-shaped upper end insertable into the recess with the sides of the U extending between the reinforcing member and the back; the ballast wire having a leg extending downwardly between the spaced-apart sides; and a ballast weight adjustably disposed on said leg of the ballast wire and being slidable thereon, whereby the lower end of the wire may be inserted into ground to provide a stake-out decoy.

5. In a decoy; a body, including a back and downwardly-extending spaced-apart sides; a reinforcing member secured to the underside of the back and having a T-shaped recess fashioned in one edge thereof; the recess defining a pair of flaps projecting toward one another; and a ballast wire having a U-shaped upper end insertable through the cross-bar of the T with the sides of the U extending between the reinforcing member and the back; the ballast wire having a leg extending downwardly from one end of the U between the spaced-apart sides; the other end of the U having a turned-down portion; said flaps hooking behind the leg and turned-down portion of the ballast wire for removably holding the U in the recess.

6. In a foldable decoy; a decoy body, including a back, downwardly-extending spaced-apart sides, a neck swingably attached to the back and being movable into a substantially horizontal position, and wings attached to the back and overlapping the sides of the body; means for securing the lower ends of the wings to the body sides; and bars secured to the neck to project underneath the wings when the neck is substantially horizontally disposed to limit further downward movement of the neck.

7. In a foldable decoy; a decoy body, including a back, downwardly-extending spaced-apart sides, a neck swingably attached to the back and being movable into a substantially horizontal position, and wings attached to the back and overlapping the sides of the body; means for securing the lower ends of the wings to the body sides; and bars secured to the neck to project underneath the wings when the neck is substantially horizontally disposed to limit further downward movement of the neck; the neck having opposing side neck sections abuttable against the leading edges of the wings when the neck is substantially horizontally disposed.

8. In a foldable decoy; a decoy body, including a back, downwardly-extending spaced-apart sides, a neck swingably attached to the back and being movable into a substantially horizontal position, and wings integrally attached to the back and separated from the sides by cut-away portions; the wings being foldable relative to the back into positions to overlap the sides; means for securing the lower ends of the wings to the sides and leaving the upper parts of the wings unattached to the sides; the neck having opposing neck side sections for overlapping the forward parts of the body sides when the neck is substantially horizontally disposed; and bars secured to the opposing side neck sections to project underneath the wings at said unattached upper parts of the latter to limit further downward movement of the neck.

WILLIAM G. COLGAN.

REFERENCES CITED

The following references are of record in the file of this patent:

UNITED STATES PATENTS

| Number | Name | Date |
| --- | --- | --- |
| 23,031 | Kinsey | Feb. 22, 1859 |
| 1,062,713 | Johnson | May 27, 1913 |
| 1,180,591 | Lee | Apr. 25, 1916 |
| 1,604,615 | Stoner | Oct. 26, 1926 |
| 1,806,456 | Haigler | May 19, 1931 |
| 2,062,098 | MacChesney | Nov. 24, 1936 |
| 2,170,953 | Spots | Aug. 29, 1939 |
| 2,256,778 | Lundgren | Sept. 23, 1941 |
| 2,395,247 | Buffenbarger | Feb. 19, 1946 |